United States Patent
Tanimoto et al.

(10) Patent No.: US 8,928,201 B2
(45) Date of Patent: Jan. 6, 2015

(54) ELECTRIC MOTOR HAVING AN OUTPUT SHAFT ROTATABLY SUPPORTED BY A HOUSING AND WORKING MACHINE INCLUDING THE SAME

(75) Inventors: Hideyuki Tanimoto, Hitachinaka (JP); Chikai Yoshimizu, Hitachinaka (JP); Nobuhiro Takano, Hitachinaka (JP); Hiromi Ozawa, Hitachinaka (JP); Kazuhiko Funabashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 300 days.

(21) Appl. No.: 13/382,868

(22) PCT Filed: Sep. 22, 2010

(86) PCT No.: PCT/JP2010/005732
§ 371 (c)(1),
(2), (4) Date: Jan. 6, 2012

(87) PCT Pub. No.: WO2011/039974
PCT Pub. Date: Apr. 7, 2011

(65) Prior Publication Data
US 2012/0104881 A1  May 3, 2012

(30) Foreign Application Priority Data

Sep. 30, 2009 (JP) ................................. 2009-229094

(51) Int. Cl.
| | |
|---|---|
| *H02K 1/22* | (2006.01) |
| *H02K 1/00* | (2006.01) |
| *H01R 39/04* | (2006.01) |
| *H02K 23/54* | (2006.01) |
| *H02K 3/26* | (2006.01) |

(52) U.S. Cl.
CPC . *H02K 23/54* (2013.01); *H02K 3/26* (2013.01)
USPC ................... 310/268; 310/40 MM; 310/233; 310/236; 310/237

(58) Field of Classification Search
CPC .................................. H02K 7/63; H01R 39/06
USPC ............ 310/40 MM, 128, 233, 236, 237, 268
See application file for complete search history.

(56) References Cited

U.S. PATENT DOCUMENTS

| | | | |
|---|---|---|---|
| 3,093,763 A | 6/1963 | Sargeant et al. | |
| 3,239,705 A | * 3/1966 | Kavanaugh | ................... 310/268 |

(Continued)

FOREIGN PATENT DOCUMENTS

| | | |
|---|---|---|
| CN | 1592047 A | 3/2005 |
| JP | 53-057414 | 5/1978 |

(Continued)

OTHER PUBLICATIONS

Chinese Office Acton with English translation issued in Chinese Application No. 201080013342.7 mailed Jun. 28, 2013.

(Continued)

*Primary Examiner* — Tran Nguyen
*Assistant Examiner* — Jose Gonzalez Quinones
(74) *Attorney, Agent, or Firm* — McDermott Will & Emery LLP

(57) ABSTRACT

A motor has an output shaft which is rotatably supported by a housing, a rotor which is fixed to the output shaft and which comprises a printed-wiring board, and a stator which is fixed to the housing and which comprises a magnet facing the rotor. The printed-wiring board comprises a coil/commutator disk and a coil disk. A commutator conductor pattern is formed in a commutator region of the coil/commutator disk. Likewise, coil conductor patterns are formed in respective coil regions of the coil/commutator disk and of the coil disk.

12 Claims, 6 Drawing Sheets

(56) References Cited

U.S. PATENT DOCUMENTS

| | | | |
|---|---|---|---|
| 3,303,371 A | | 2/1967 | Moressee et al. |
| 3,350,864 A | * | 11/1967 | Sheps et al. .................. 56/16.9 |
| 3,525,008 A | * | 8/1970 | Burr .............................. 310/268 |
| 4,143,288 A | | 3/1979 | Sato |
| 4,982,130 A | * | 1/1991 | Cap et al. ..................... 310/268 |
| 5,541,898 A | * | 7/1996 | Kasuga et al. ............. 369/44.14 |
| 5,804,905 A | | 9/1998 | Knoerzer |
| 2009/0267434 A1 | * | 10/2009 | Park ................................ 310/81 |

FOREIGN PATENT DOCUMENTS

| | | |
|---|---|---|
| JP | 60-162461 | 8/1985 |
| JP | 60-162461 A | 8/1985 |
| JP | 60162461 A * | 8/1985 |
| JP | 2003-299288 | 10/2003 |
| JP | 2007-116956 A | 5/2007 |
| JP | 2009-039058 A | 2/2009 |
| NL | 250 953 A | 2/1964 |
| WO | WO 2006/122523 A1 | 11/2006 |

OTHER PUBLICATIONS

Japanese Office Action with English Translation issued in Japanese Application No. 2009-229094 mailed Aug. 27, 2013.

International Search Report issued in International Patent Application No. PCT/JP2010/005732, mailed Oct. 28, 2011.

* cited by examiner

ELECTRIC MOTOR HAVING AN OUTPUT SHAFT ROTATABLY SUPPORTED BY A HOUSING AND WORKING MACHINE INCLUDING THE SAME

RELATED APPLICATIONS

This application is the U.S. National Phase under 35 U.S.C. §371 of International Application No. PCT/JP2010/005732, filed on Sep. 22, 2010, which in turn claims the benefit of Japanese Application No. 2009-229094, filed on Sep. 30, 2009, the disclosures of which Applications are incorporated by reference herein.

TECHNICAL FIELD

The present invention relates to an electric motor and a working machine having the same as a drive source.

BACKGROUND ART

An example of working machines having an electric motor as a drive source is a electric brush cutter which mows grasses, etc. The electric brush cutter has a lower running cost than that of an engine-driven brush cutter which uses a fuel. Moreover, because the performance of motors is being improved, electric brush cutters become widespread more and more.

Some electric motors have a rotor having a printed-wiring board. For example, Patent Literature 1 discloses a discoidal rotor comprising a stacked body of a commutator disk having a conductor pattern of a commutator formed thereon and a coil disk having a conductor pattern of a coil formed thereon. Most of such electric motors are small and have a flat shape, and in addition, have a low vibration level and a low noise level, and attract attention as a drive source for various kinds of working machines.

CITATION LIST

Patent Literature

[PTL 1]
Unexamined Japanese Patent Application KOKAI Publication No. 2003-299288

SUMMARY OF INVENTION

Technical Problem

The rotor disclosed in Patent Literature 1 has the commutator and the coil formed separately on the commutator disk and on the coil disk, respectively, so that the manufacturing of the rotor and the assembling thereof are bothersome.

Solution to Problem

In view of the foregoing problem, it is an object of the present invention to provide an electric motor which has a rotor comprising a printed-wiring board and which can be easily manufactured and assembled, and a working machine having the same.

To achieve the foregoing problem, an electric motor according to the present invention is an electric motor comprising an output shaft rotatably supported by a housing, and comprises a rotor which comprises a printed-wiring board including a coil/commutator disk and at least one coil disk, the coil/commutator disk having a coil conductor pattern and a commutator conductor pattern both formed thereon, the coil disk having a coil conductor pattern formed thereon; and the rotor being fixed to the output shaft and being retained in the housing, and a stator which is fixed to the housing and which comprises a magnet facing the rotor.

It is desirable that the rotor further comprise a flange which is fixed to the output shaft and which has a flat surface substantially vertical to the output shaft, and the printed-wiring board be supported by the flat surface and fixed to the flange.

It is desirable that the rotor comprise a yoke bonded on the printed-wiring board.

It is desirable that the conductor pattern of the coil/commutator disk be formed so as to be thicker than the conductor pattern of the coil disk.

It is desirable that the rotor comprise a protecting disc for protecting at least part of either one of the coil disk and the coil/commutator disk.

The protecting disc may comprise a blade for generating a wind in the housing by rotation of the rotor.

The rotor may comprise a balancing part for correcting an imbalance of the rotor.

The yoke may be provided with a balancing part for correcting the imbalance of the rotor.

It is desirable that an insulator be provided between the output shaft and the flange.

It is desirable that an insulator be provided between the flange and the printed-wiring board.

Moreover, a working machine according to the present invention comprises the foregoing electric motor; and a working tool connected to the output shaft of the electric motor.

The foregoing working machine may further comprise an operating unit spaced apart from the electric motor; and a linking unit linking the operating unit and the electric motor together, wherein an exhaust port may be formed in the housing, and an intake port communicating with an interior of the housing may be formed in the linking unit so as to be apart from the working tool.

Advantageous Effects of Invention

According to the present invention, it is possible to provide the electric motor which has the rotor comprising the printed-wiring board and which is easily manufactured and assembled, and the working machine having the same.

DESCRIPTION OF EMBODIMENTS

An explanation will be given of an embodiment of the present invention with reference to the accompanying drawings.

First Embodiment

Figure 1:
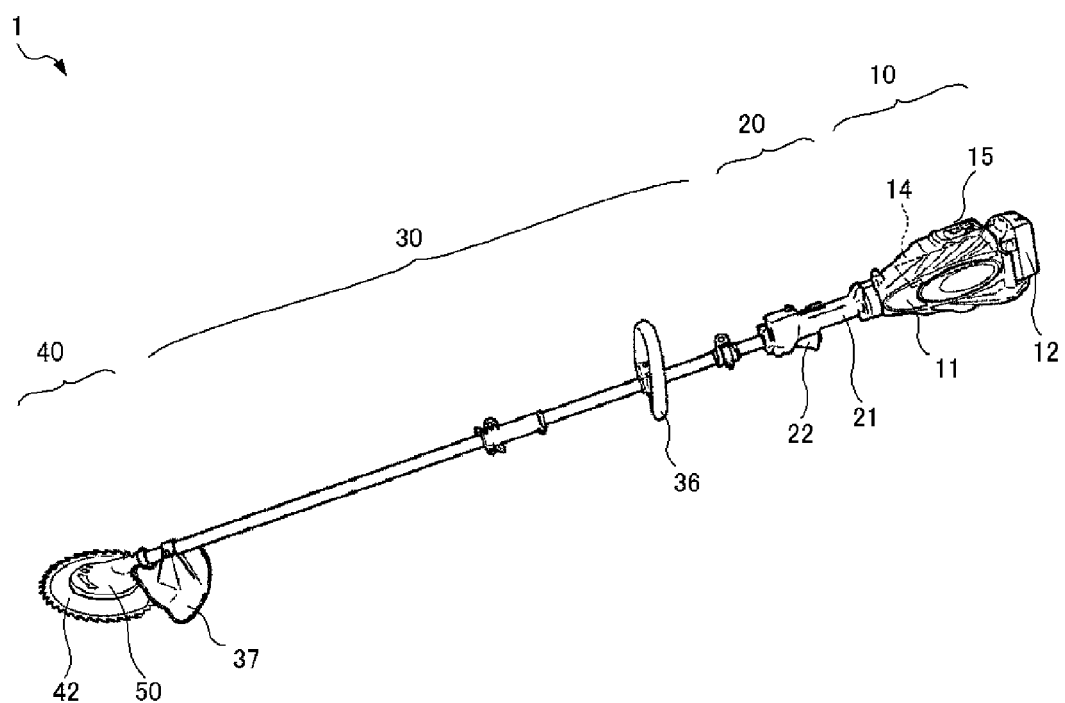
FIG. 1 is a perspective view showing a electric brush cutter according to an embodiment of the present invention.

A working machine according to the first embodiment is a electric brush cutter 1 shown in FIG. 1. The electric brush cutter 1 comprises a power-source unit 10, an operating unit 20, a linking unit 30, and a drive unit 40.

The power-source unit 10 has a power-source housing 11, a battery 12, and a power-source circuit 14.

The power-source housing 11 retains the power-source circuit 14 thereinside. Moreover, a main switch 15 for turning on and off the power-supply circuit 14 is provided on the top face of the power-source housing 11.

The battery 12 is attached to a non-illustrated battery holder provided in the power-source housing 11, and supplies electric power to the power-source circuit 14.

The power-source circuit 14 converts an output voltage by the battery 12 into a predetermined magnitude, and outputs the converted output voltage to a motor 50 of the drive unit 40 to be discussed later.

The operating unit 20 has a handle 21 and a trigger switch 22.

The handle 21 is fixed to the power-source housing 11 of the power-source unit 10, and fixed to one end of the linking unit 30. The trigger switch 22 is connected to the power-source circuit 14 of the power-source unit 10. The trigger switch 22 causes an output voltage by the power-source circuit 14 to be active/inactive, and adjusts the output voltage by the power-source circuit 14 in accordance with a pulling level. Consequently, the trigger switch 22 drives/stops the motor 50, and adjusts an output (revolution) by the motor 50 in accordance with the pulling level.

The linking unit 30 is a hollow tube formed of an aluminum alloy, a reinforced plastic, etc., and links the operating unit 20 and the drive unit 40 together. Inserted into the linking unit 30 is a non-illustrated power wire running from the power-source circuit 14 of the power-source unit 10 to the motor 50 of the drive unit 40. Moreover, the linking unit 30 is provided with an auxiliary handle 36. Furthermore, the linking unit 30 is provided with a protective cover 37 covering a part of a rotating blade 42 of the drive unit 40.

The drive unit 40 has the motor 50 and the rotating blade 42. As electric power is supplied from the power-source circuit 14 of the power-source unit 10, the motor 50 rotates the rotating blade 42.

Next, the motor 50 will be explained in detail with reference to FIG. 2.

The motor 50 is a commutator motor having a motor housing 51, an output shaft 52, a rotor 53, a stator 54, and a slider 55.

The motor housing 51 is fixed to the other end of the linking unit 30. The motor housing 51 is provided with an exhaust port 56. Note that an intake port 38 communicating with the interior of the motor housing 51 is formed in the linking unit 30.

The output shaft 52 is rotatably supported by bearings 57, 58 provided in the motor housing 51. One end of the output shaft 52 protrudes from the motor housing 51, and the rotating blade 42 is fixed to the one end.

Figure 3:
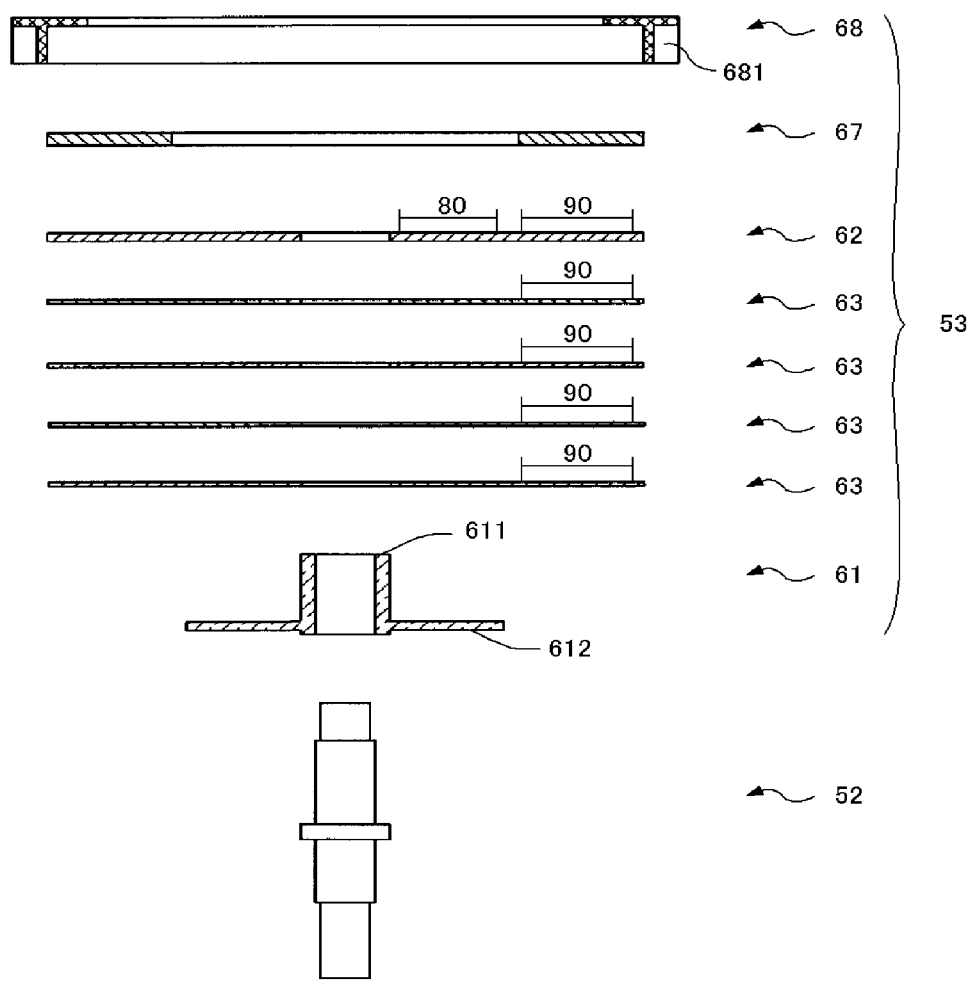
FIG. 3 is an exploded cross-sectional view showing an output shaft of the motor shown in FIG. 2 and a rotor thereof.

The rotor 53 is retained in the motor housing 51 and provided integrally with the output shaft 52. As shown in FIG. 3, the rotor 53 has a flange 61, a coil/commutator disk 62, four coil disks 63, a rotor yoke 67, and a protecting disc 68.

The flange 61 is formed of an aluminum alloy, and has a cylindrical fixing member 611 and a discoid supporting member 612 extending substantially vertically from the outer circumferential face of the fixing member 611. As the fixing member 611 is fitted with the output shaft 52 and is prevented from rotating around the output shaft 52, so that the flange 61 rotates together with the output shaft 52.

The coil/commutator disk 62 and the coil disks 63 are each formed in a discoid shape having a fitting hole at a center and are each a printed-wiring board which is an insulator substrate having a conductor pattern formed thereon. One coil/commutator disk 62 and four coil disks 63 are stacked together with the coil/commutator disk 62 being a top layer.

An annular commutator region 80 is provided on the top face of the coil/commutator disk 62. A non-illustrated commutator is formed in the commutator region 80 by means of a conductor pattern. The commutator comprises non-illustrated plural commutator pieces arranged in a circumferential direction.

Moreover, provided on the top face of coil/commutator disk 62 and on that of the coil disks 63 is an annular coil region 90 located outwardly of the commutator region 80. Formed in each coil region 90 are non-illustrated plural coils arranged in the circumferential direction by means of substantially same conductor patterns. Note that the coils formed in each coil region 90 are formed so as to generate a magnetic field in the vertical direction, i.e., the axial direction of the output shaft 52. The coil/commutator disk 62 and the coil disks 63 are stacked together with a predetermined arrangement so that the coils formed in each coil region 90 are arranged in the circumferential direction with a substantially equal clearance.

One end of the coil formed in the coil region 90 of the coil/commutator disk 62 and the other end of that coil are directly connected to, by means of a conductor pattern, a corresponding commutator piece formed in the commutator region 80. Moreover, one end of the coil formed in the coil region 90 of the coil disk 63 and the other end of that coil are connected to a corresponding commutator piece formed in the commutator region 80 via a non-illustrated through hole or via formed in the commutator region 80.

Note that the respective conductor patterns in the commutator region 80 and in the coil region 90 both provided on the coil/commutator disk 62 are formed on the same printed wiring. Moreover, the conductor pattern of the coil/commutator disk 62 is formed so as to be thicker than that of the coil disk 63.

Furthermore, the coil/commutator disk 62 has substantially equal internal diameter and external diameter to those of the coil disk 63. The coil/commutator disk 62 and the coil disks 63 are fitted with the fixing member 611 of the flange 61, supported by the top face of the supporting member 612 of the flange 61, and fixed to the flange 61.

The rotor yoke 67 is formed of iron in an annular plate shape, and bonded on the top face of the coil/commutator disk 62 via a non-illustrated insulating layer. The rotor yoke 67 has a substantially equal external diameter to that of the coil/commutator disk 62 and that of the coil disk 63, and has an internal diameter which allows the coil region 90 to be covered.

Figure 4:
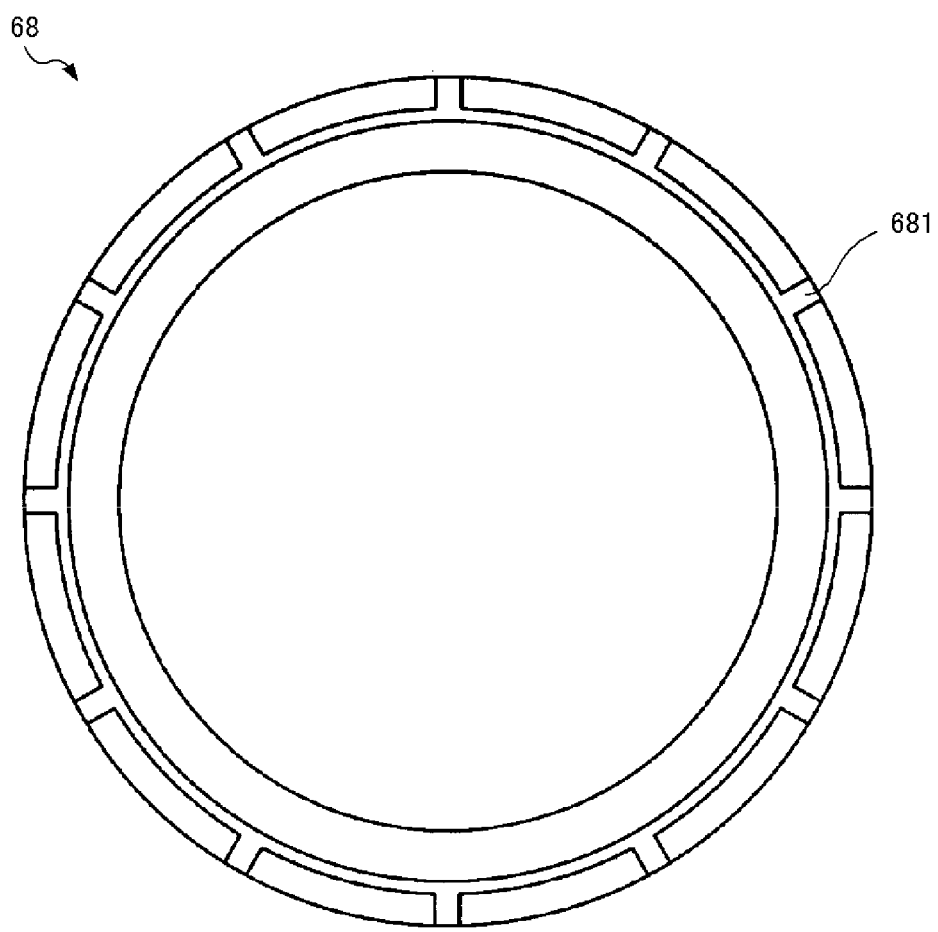
FIG. 4 is a bottom view showing a fan of the rotor shown in FIG. 3.

The protecting disc 68 is formed of a synthetic resin in an annular shape. The protecting disc 68 is fitted with respective outer circumferential faces of the rotor yoke 67, of the coil/commutator disk 62, and of the coil disks 63, and bonded on the top face of the rotor yoke 67 via a non-illustrated adhesion layer. The protecting disc 68 has plural blades 681 formed protrudingly in the direction of an external diameter. As shown in FIG. 4, the plural blades 681 are arranged at a substantially equal clearance in the circumferential direction.

Figure 2:
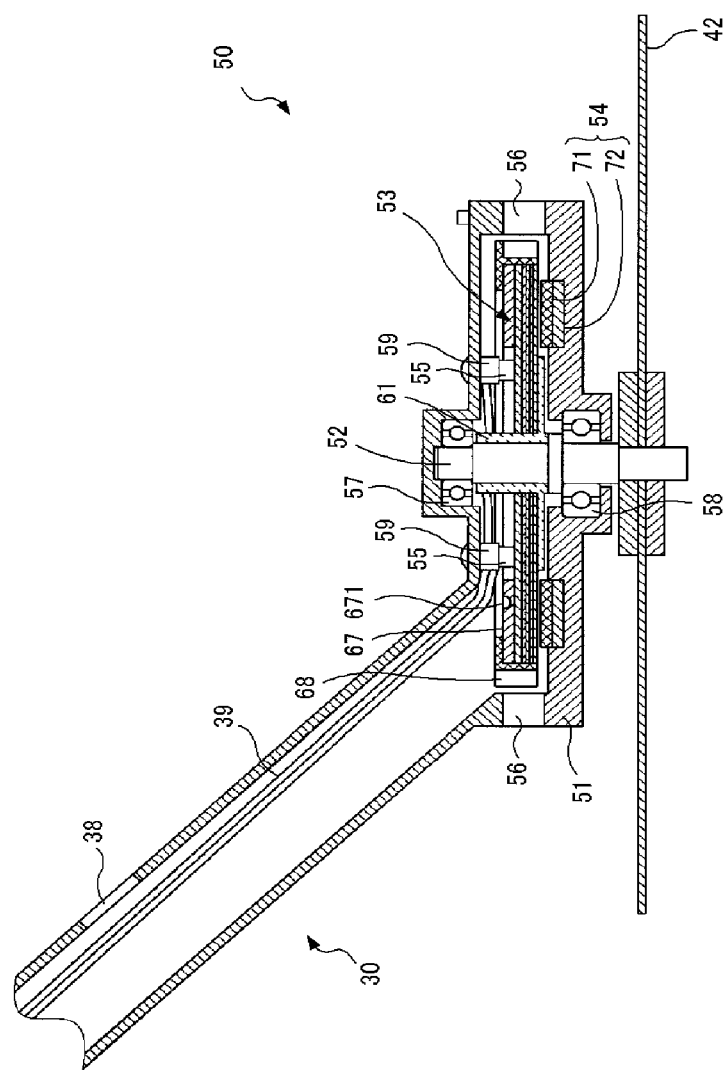
FIG. 2 is a cross-sectional view showing a motor of the electric brush cutter shown in FIG. 1.

Note that as shown in FIG. 2, in order to correct the imbalance of the rotor 53 (the imbalance of weight relative to the rotating shaft), the rotor yoke 67 has a top face drilled so as to have a hole 671. That is, the rotor yoke 67 configures a balancing part of the present invention. Note that a weight may be put on the top face of the rotor yoke 67 so as to correct the imbalance of the rotor 53.

The stator 54 has a magnet 71 and a stator yoke 72. The magnet 71 has magnetic poles arranged in the circumferential direction and is formed in an annular shape. The magnet 71 faces the coil disk 63 at the lowermost layer, faces respective coil regions 90 of the coil/commutator disk 62 and of the coil disks 63, and bonded on the stator yoke 72. The stator yoke 72 is formed in an annular shape having substantially equal internal diameter and external diameter to those of the magnet 71, and fixed to the motor housing 51.

The two sliders 55 are held by two slider holders 59 fixed to the motor housing 51. The two sliders 55 abut the two commutator pieces formed in the commutator region 80 of the coil/commutator disk 62. The slider 55 is formed of carbon having an electric conductivity, and connected to the power-source circuit 14 of the power-source unit 10 via a power wiring 39 inserted in the linking unit 30.

A voltage applied to the slider 55 from the power-source circuit 14 of the power-source unit 10 is successively applied to the coils of the rotor 53 via the commutator of the rotor 53. A torque is generated at the rotor 53 and at the output shaft 52 fixed thereto by suction generated between the excited coil and the magnet 71 of the stator 54, thereby rotating the rotating blade 42.

As explained above, the motor 50 employing the foregoing configuration has the coil/commutator disk 62 having the conductor pattern of the commutator and that of the coil both formed thereon. In the coil/commutator disk 62, the conductor pattern of the commutator and that of the coil can be formed at the same time as those conductor patterns are disposed in the inward commutator region 80 and in the outward coil region 90, respectively. Moreover, in the coil/commutator disk 62, the conductor pattern of the commutator and that of the coil can be formed by directly connected together. Consequently, the rotor 53 of the motor 50 can be easily manufactured and assembled in comparison with a case in which a conductor pattern of a commutator and that of a coil are formed on separate printed-wiring boards, respectively, like the rotor disclosed in Patent Literature 1.

Moreover, the rotor 53 has the flange 61 which supports the coil disks 63. Accordingly, the coil/commutator disk 62 and the coil disks 63 are prevented from being deformed by suction or the like generated between the rotor 53 and the stator 54. Furthermore, because the inertia of the rotor 53 increases, any irregularity in a rotation of the rotor 53 is reduced, thereby suppressing any vibration and noise.

Moreover, the rotor yoke 67 is bonded not to the motor housing 51, but on the coil/commutator disk 62. Accordingly, any distortion of the coil/commutator disk 62 and that of the coil disks 63 are suppressed. Furthermore, because the inertia of the rotor 53 increases, any irregularity in a rotation of the rotor 53 is reduced, thereby suppressing any vibration and noise. As the coil region 90 is covered by the rotor yoke 67, the conductor pattern of the coil is prevented from being damaged. Moreover, the imbalance of the rotor 53 can be corrected by forming a hole in the rotor yoke 67 or by adding a weight thereto. Accordingly, any vibration and noise originating from the imbalance of the rotor 53 are suppressed.

Moreover, the conductor pattern of the coil/commutator disk 62 is formed so as to be thicker than that of the coil disk 63. Accordingly, the conductor pattern of the commutator formed on the coil/commutator disk 62 has good durability against sliding with the slider 55. Furthermore, as the rigidity of the coil/commutator disk 62 increases, any deformation of the coil/commutator disk 62 and that of the coil disk 63 are prevented.

Moreover, since the coil/commutator disk 62 and the coil disk 63 are covered by the protecting disk 68, the rotor 53 is prevented from being damaged and the disks are prevented from peeling. Furthermore, as the protecting disk 68 is provided with blade 681, any burnout and reduction of output due to the overheating of the motor 50 are prevented.

Moreover, as the magnet 71 is formed in the annular shape with magnetic poles being arranged in the circumferential direction, the number of components is reduced in comparison with a case in which plural magnets are used.

Furthermore, it is possible to configure the electric brush cutter 1 by using the motor 50 as a drive source.

The electric brush cutter 1 comprises the rotating blade 42 fixed to the output shaft 52, the operating unit 20 apart from the motor 50, and the linking unit 30 which links the operating unit 20 and the motor 50 together. The exhaust port 56 is formed in the motor housing 51, and the intake port 38 is formed in the linking unit 30. Accordingly, the cooling efficiency of the motor 50 is improved by an air intake/exhaustion through the motor housing 51. Moreover, as the intake port 38 is spaced apart from the rotating blade 42, any entering of foreign substances into the motor housing 51 is suppressed.

Second Embodiment

Figure 5:
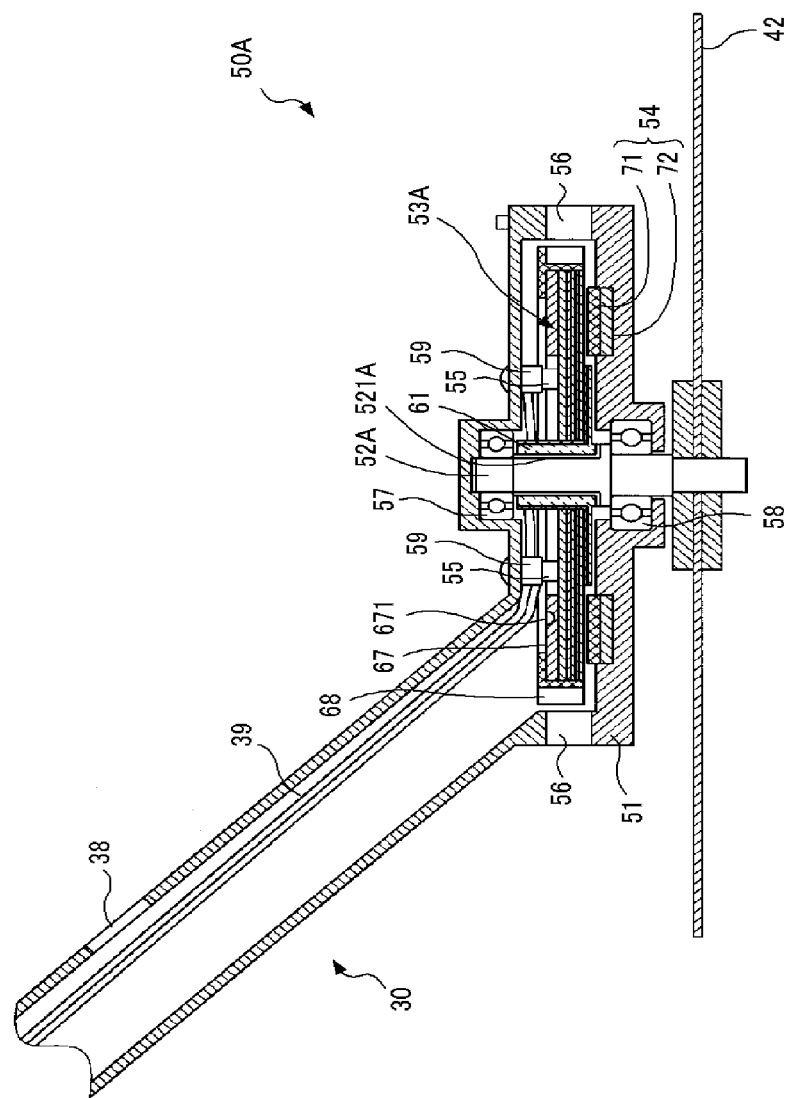
FIG. 5 is a cross-sectional view showing a modified example of the motor shown in FIG. 2.

An electric motor according to a second embodiment is a motor 50A shown in FIG. 5.

Figure 6:
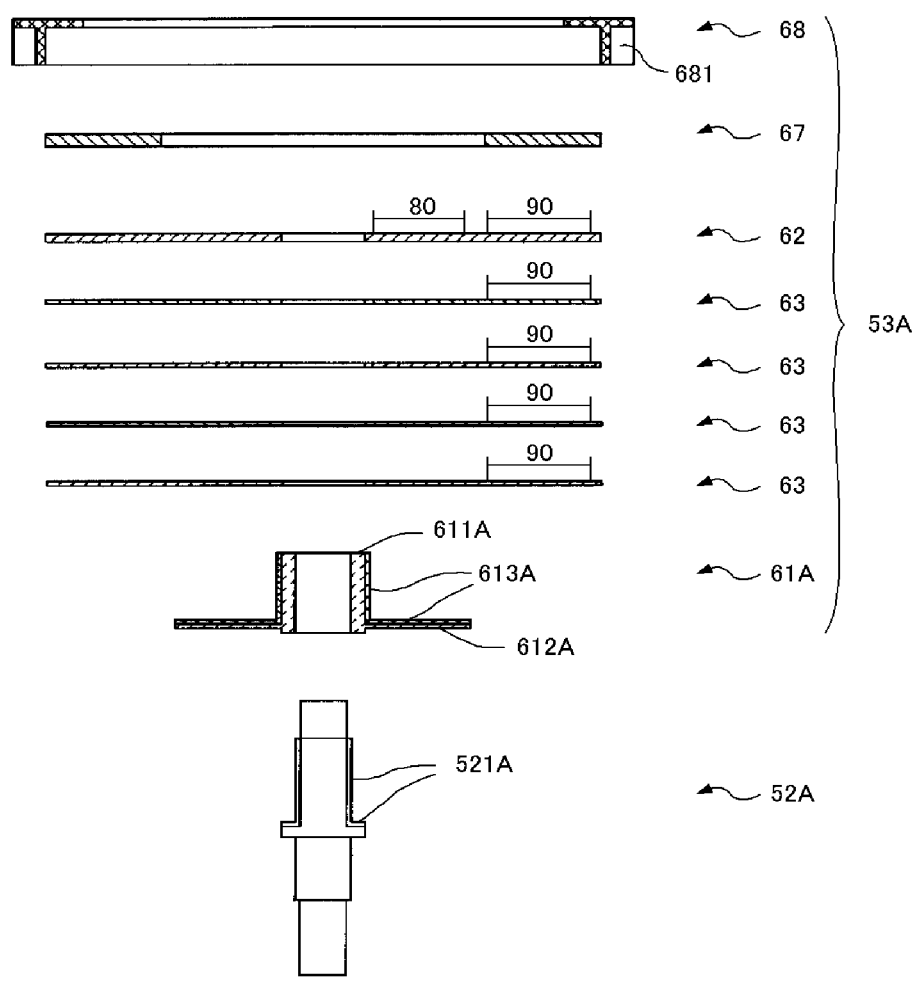
FIG. 6 is an exploded cross-sectional view showing an output shaft of the motor shown in FIG. 5 and a rotor thereof.

The motor 50A differs from the motor 50 of the first embodiment that an insulator 521A is provided between an output shaft 52A and a rotor 53A. The insulator 521A is formed of a synthetic resin, and as shown in FIG. 6, formed integrally with the output shaft 52A. Consequently, an insulation treatment is made between the output shaft 52A and a flange 61A.

Moreover, the flange 61A has an insulator 613A formed integrally with the outer face of a fixing member 611A and with the top face of a supporting member 612A. Consequently, an insulation treatment is made between the flange 61A and a coil/commutator disk 62, coil disks 63 and a rotor yoke 67.

According to the motor 50A employing the above-explained configuration, the same effect as that of the motor 50 of the first embodiment can be acquired, and in addition to this effect, the insulation characteristic is obtained by a simple configuration. Moreover, as a double insulation is made, it is possible to form a class-II structure and a class-II device both prescribed in JIS-C9335-1. Consequently, by using the motor 50A for the foregoing electric brush cutter 1, it becomes possible to increase the output by the motor 50A with an output voltage by the power-source circuit 14 being set to equal to 42 V or higher while ensuring the sufficient level of the insulation characteristic.

Modified Embodiments

Note that the present invention is not limited to the foregoing embodiments, and various changes and modifications made within the scope and the spirit of the present invention are included in the scope and the spirit of the present invention.

For example, in the embodiments, although the conductor pattern of the coil is formed on the respective top faces of the coil/commutator disk 62 and of the coil disks 63, such conductor pattern may be formed on top and bottom faces of the coil/commutator disk 62 and on those of the coil disk 63 by applying an appropriate insulation treatment. Accordingly, as a rotor having a ten-layer coil is formed, it becomes possible to provide a high-power motor in comparison with a rotor having an eight-layer coil like the rotor disclosed in Patent Literature 1. Moreover, the number of the stacked coil disks 63 is four in the embodiments, but is not limited to this number, and can be equal to this number or larger, or equal to this number or less.

Moreover, in the embodiments, although each of the coil/commutator disk 62 and the coil disks 63 is a printed-wiring board, the present invention is not limited to this configuration, and for example, each of those disks may be a layer configuring a multilayer printed-wiring board.

Furthermore, in the embodiments, the coil/commutator disk 62 and the coil disks 63 are stacked together so that the coils formed in each coil region 90 are arranged with a substantially equal clearance in the circumferential direction, but the present invention is not limited to this configuration. For example, such disks may be stacked together so that the coils formed in the respective coil regions 90 may overlap each other. Regarding respective configurations of the conductor patterns of the coil and of the commutator formed on the coil/commutator disk 62 and on the coil disk 63, respectively, those configurations can be changed arbitrarily as far as a commutator motor can be formed.

Moreover, in the embodiments, although the rotors 53, 53A are each provided with the protecting disk 68 having the blade 681 protruding in the direction toward the external diameter, the fan of the present invention is not limited to this form, and for example, may have a blade formed at the coil/commutator disk 62, at the coil disk 63, at the flanges 61, 61A, and/or at the rotor yoke 67 so as to protrude from the top face, the outer face, or the bottom face of the rotors 53, 53A.

Furthermore, in the embodiments, although the rotor yoke 67 is used as the balancing part for correcting the imbalance of the rotors 53, 53A, the balancing part of the present invention is not limited to this form, and for example, the flanges 61, 61A may be used as the balancing part.

Moreover, the present invention is not limited to the electric brush cutter exemplified in the embodiments, is widely applicable to working machines having an electric motor as a drive source, and in particular, is suitable for machines, such as a sander, a polisher, a router, and a dust collector, in which the rotation of the electric motor is directly transmitted to a working tool (e.g., a rotating blade or a fan) without any reducer intervening.

In addition, the material, the shape, the numerical quantity, the disposition and the like of each structural element can be changed and modified as needed as far as the object of the present invention can be accomplished.

Having described and illustrated the principles of this application by reference to preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Application JP2009-229094 filed Sep. 30, 2009, the entire disclosure of which is incorporated by reference herein.

REFERENCE SIGNS LIST

1 electric brush cutter
10 power-source unit
11 power-source housing
12 battery
14 power-source circuit
15 main switch
20 operating unit
22 trigger switch
30 linking unit
36 auxiliary handle
37 protective cover
38 intake port
39 power wiring
40 drive unit
42 rotating blade
50, 50A motor
51 motor housing
52, 52A output shaft
53, 53A rotor
54 stator
55 slider
56 exhaust port
57, 58 bearing
59 slider holder
61, 61A flange
62 coil/commutator disk
63 coil disk
67 rotor yoke
68 protecting disk
71 magnet
72 stator yoke
80 commutator region
90 coil region
521A insulator
611, 611A fixing member
612, 612A supporting member
613A insulator
671 hole
681 blade

The invention claimed is:

1. An electric motor comprising;
an output shaft rotatably supported by a housing; and,
a rotor which comprises a printed-wiring board including a first coil disk and a second coil disk, the first coil disk having a first coil conductor pattern formed thereon, the second coil disk having a second coil conductor pattern formed thereon, and the rotor being fixed to the output shaft and being retained in the housing,
wherein the first coil conductor pattern is formed so as to be thicker than the second coil conductor pattern in an axial direction of the output shaft.

2. The electric motor according to claim 1, wherein:
the rotor further comprises a flange which is fixed to the output shaft and which has a flat surface substantially vertical to the output shaft, and
the printed-wiring board is supported by the flat surface and fixed to the flange.

3. The electric motor according to claim 1, wherein the rotor comprises a yoke bonded on the printed-wiring board.

4. The electric motor according to claim 1, wherein the rotor comprises a protecting disc for protecting at least part of either one of the first coil disk and the second coil disk.

5. The electric motor according to claim 4, wherein the protecting disc comprises a blade for generating a wind in the housing by rotation of the rotor.

6. The electric motor according to claim 1, wherein the rotor comprises a balancing part for correcting an imbalance of the rotor.

7. The electric motor according to claim 6, wherein a yoke is provided with a balancing part for correcting an imbalance of the rotor.

8. The electric motor according to claim 2, wherein an insulator is provided between the output shaft and the flange.

9. The electric motor according to claim 2, wherein an insulator is provided between the flange and the printed-wiring board.

10. A working machine comprising:
   the electric motor according to claim 1; and
   a working tool connected to the output shaft of the electric motor.

11. The working machine according to claim 10, further comprising:
   an operating unit spaced apart from the electric motor; and
   a linking unit linking the operating unit and the electric motor together, wherein:
   an exhaust port is formed in the housing, and
   an intake port communicating with an interior of the housing is formed in the linking unit so as to be apart from the working tool.

12. An electric motor comprising:
   an output shaft rotatably supported by a housing; and
   a rotor which comprises a printed-wiring board including a plurality of coil disks, each of the coil disks having a coil conductor pattern formed thereon, and the rotor being fixed to the output shaft and being retained in the housing; and
   a stator which is fixed to the housing and which comprises a magnet facing the rotor, wherein:
   the rotor comprises a balancing part for correcting an imbalance of the rotor, and
   the balancing part is arranged on the top stacked coil disk in the stacking direction of the stacked coil disks and formed in an annular shape.

* * * * *